United States Patent Office 2,885,414
Patented May 5, 1959

2,885,414

PREPARATION OF PARTIAL GLYCERIDES

Robert E. Beal, Elmwood, Ill., assignor to the United States of America as represented by the Secretary of Agriculture No Drawing. Application October 16, 1957
Serial No. 690,592

5 Claims. (Cl. 260—403)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the controlled hydrolysis of phosphatides whereby to obtain partial glycerides, that is, mono- and di-glycerides. The prime object of the invention is the provision of processes whereby phosphatides are selectively hydrolyzed to produce partial glycerides. Further objects and advantages of the invention will be obvious from the following description.

Phosphatides are natural constituents of many animal and vegetable products. They are related to the natural fats and oils in that they are glycerol esters. In the fats and oils, the glycerol nucleus is esterified with fatty acids whereas in the phosphatides the glycerol nucleus is esterified with fatty acids and with phosphoric acid. In general, the phosphatides contain many individual compounds all containing the basic elements of glycerol, fatty acid, and phosphoric acid. A typical individual phosphatide which illustrates the general structure of these compounds is alpha-phosphatidyl choline, a primary constituent of lecithin. Its structure is as follows, wherein

is the acyl radical of a fat acid.

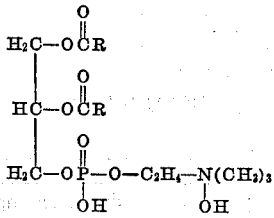

Typically, the phosphate ester group of the phosphatide contains radicals derived from choline, ethanolamine, inositol, etc. In the compound above, one hydroxy group of the phosphoric acid residue is esterified with choline.

In general, it is known that phosphatides can be hydrolyzed. However, in the previous processes the hydrolytic action was not selective in that it caused hydrolysis of fatty acid ester groups as well as hydrolysis of phosphate ester groups. As a consequence, the end product was largely a mixture of glycerol, free fatty acids, phosphoric acid and amine. Partial glycerides, if at all present, were in a very minor amount.

It has now been found that under the conditions described below, phosphatides can be selectively hydrolyzed to produce partial glycerides. The process of this invention is selective in that it causes the phosphate ester group of the phosphatide to be hydrolyzed while causing only a minor degree of hydrolysis of the fatty acid ester groups in the phosphatide structure. The net result is that the product is largely a diglyceride with a lesser amount of monoglyceride. Another advantage is that when a material containing phosphatides and glyceride oil is subjected to the process of the invention, the phosphatide is largely hydrolyzed without material hydrolysis of the glyceride oil. Thus the glyceride oil remains essentially intact though the phosphatide is hydrolyzed. This feature enables the process to be applied to phosphatide-containing oils without impairment of the chemical structure and character of the oil itself.

Briefly described, the process of the invention involves heating a mixture of the phosphatide, water, and a cation or a mixture of cation and anion exchange materials.

The hydrolysis is generally conducted at a temperature from about 100° to about 150° C., preferably in a closed vessel under autogenous pressure. The time of reaction will vary inversely with the temperature, for example, from ¼ hour at 150° C. to about 4 hours at 100° C. In any particular instance, completion of the reaction is indicated by the fact that the phosphorus content of the original phosphatide is largely in the water phase of the reaction system and is largely insoluble in a hydrocarbon solvent such as hexane.

The cation exchanger may be any of the products available commercially, examples being sulphonated coal, sulphonated polystyrene, sulphonated phenolformaldehyde resins, zeolites, and the like. The cation exchanger is usually applied to the reaction in the hydrogen form, although a mixture containing both the hydrogen form and the alkali metal form may be used. The anion exchanger, also available commercially, is similar to the cation resin except that instead of sulphonic acid groups it has quaternary ammonium or amine groups attached to a polymer matrix. The anion exchanger is supplied to the reaction in the hydroxyl form. Although the hydrolysis may be conducted using only the cation resin as a catalyst, it is preferred to use an approximately equivalent weight of anion resin with the cation resin to suppress hydrolysis of glycerol-fatty acid bonds. The function of the anion resin is apparently to remove free phosphoric acid, formed as a result of hydrolysis, from the aqueous phase, and thus to maintain the hydrogen ion concentration of that phase at or near a pH of 7. Presumably, the same result might be accomplished by the addition of suitable increments of aqueous sodium hydroxide or other base during the progress of the hydrolysis, to control the pH, in which case it would be unnecessary to employ an anion resin. If only a cation resin is used to perform the hydrolysis it has been found desirable to add an inert hydrocarbon solvent such as hexane, kerosene or the like to the reaction mixture to reduce the hydrolysis of glycerol-fatty acid bonds which produces undesirable free fatty acids. However, the use of an anion resin is much more effective for suppressing free fatty acid formation than is the use of an inert solvent.

The amount of cation resin used in performing the hydrolysis is not critical, generally about 0.1 to 2 parts of cation exchanger, containing 50 to 75 percent of moisture, are employed per part of phosphatide.

As noted above, water is a necessary component in the reaction mixture. The amount of water may be as low as that stoichiometrically necessary for the hydrolysis, i.e., one mole water per mole of phosphatide.

Usually it is preferred to employ an excess. For example where the phosphatides in crude oil are hydrolyzed in situ, one may use about from 4 to 50 parts by weight of water per 100 parts by weight of oil. Where the reaction is applied to a phosphatide as such or in crude gum form, enough water is added to produce a fluid mixture—usually about 1 to 5 times the weight of phosphatide. In summation, the amount of water should be at least about 0.02 part water per part of phosphatide and may be as high as desired above this minimum limit.

The hydrolysis process may be applied to the phosphatides in isolated form, in crude gum form, or the phosphatides may be hydrolyzed in situ in a crude oil. Most glyceride oils of vegetable origin such as soybean oil, olive oil, sesame oil, cottonseed oil, linseed oil, peanut oil, corn oil, rice oil, etc. naturally contain phosphatides in a proportion of about 1 to 4 percent when recovered in their crude state. By applying the process of the invention to such crude oils containing phosphatides, one obtains a glyceride oil containing an enhanced proportion of partial glycerides. Oils of this type are particularly useful for the preparation of margarine and other food products. The partial glycerides enable the oil to be more easily blended with non-fat milk solids and other components of a hydrophilic nature which must be incorporated with the oil to produce the margarine. The presence of partial glycerides also improves the oil in its ability to blend with flour and other ingredients in the preparation of bakery products.

Application of the process of the invention to crude, phosphatide-containing oils has the advantage that the phosphatides are hydrolyzed to partial glycerides while the triglycerides which make up the bulk of the oil are not hydrolyzed to any material extent. As a net result the partial glycerides formed by the phosphatide hydrolysis improve the usefulness of the oil for many applications and at the same time the original triglyceride content of the oil is maintained essentially intact.

The process of the invention is admirably suited to producing partial glycerides from the phosphatide-containing gums obtained in the refining of crude vegetable oils. These gums are generally obtained by treating the crude glyceride oil with steam and centrifuging the mixture to obtain a gum-free oil and a crude gum containing phosphatides, water, and some oil. This crude gum can be directly subjected to the hydrolytic treatment of the invention.

If desired, an inert solvent may be added to the reaction mixture to promote contact between the reactants and to increase the fluidity of the mixture so that it can be agitated more effectively. For this purpose, one may employ benzene, toluene, or various petroleum hydrocarbon mixtures such as those in the naphtha, gasoline, or kerosene boiling ranges. It is evident that any inert, volatile organic solvent can be used for the purpose.

After the reaction has been completed the partial glycerides may be recovered in various ways. For example, the reaction mixture may be subjected to centrifugation to separate the partial glycerides (or the oil containing partial glycerides) from the aqueous material and the cation exchanger. If desired, the reaction mixture can be simply allowed to stand and the partial glycerides separated by decanting. The reaction mixture can be subjected to filtration to first remove the cation exchanger and the resulting mixture of the partial glycerides and watery material separated by centrifugation, decanting, etc. Where a volatile solvent is used in the reaction it is removed from the partial glyceride product by vacuum or steam distillation. The aqueous layer, after separation, may be washed one or more times with an inert solvent such as aromatic or aliphatic hydrocarbons to separate unreacted phosphatides therefrom.

The cation exchange material separated from the reaction products may, of course, be regenerated for use with another batch of raw material. For this purpose it is washed with an acid such as hydrochloric or sulphuric to convert it to the hydrogen form and to displace any adsorbed amine constituents derived from the phosphatide hydrolysis products. After treatment with acid the exchanger is washed with water. If a mixture of cation and anion materials is used to catalyze the hydrolysis, they may be separated after washing the resin mixture with a solvent such as a ketone, alcohol or the like, to free it of adhering material, into layers of cation and anion resin by passing water upwards through the mixture contained in a vertical column at an appropriate flow rate. Each layer of resin is regenerated to its original form by separate treatment with aqueous acid or aqueous alkali, as the case may be followed by separate washing of each layer with water to remove excess reagent. This technique is used to regenerate a mixture of cation and anion resins which have been used for demineralizing water by the monobed method.

One of the features of the hydrolytic process of the invention is that no emulsifying agent is added to the reaction mixture. Processes have been described wherein a mixture of glyceride oil, water, cation exchange material, and emulsifying agent is heated to obtain hydrolysis. The presence of the emulsifying agent promotes the hydrolysis of fatty acid ester groups. We have found that when no emulsifying agent is added, the reaction largely involves hydrolysis of the phosphate ester groups, leaving the fatty acid ester groups intact. The fatty acid ester-splitting effect of added emulsifying agents is illustrated in the Comparative Test, below.

The invention is further demonstrated by the following illustrative examples.

EXAMPLE I

| | Grams |
|---|---|
| Gum from crude soybean oil | 5 |
| Water | 25 |
| Sulphonated polystyrene resin exchanger in H+ form | 3.5 |
| Deodorized kerosene | 100 |

The above materials were heated at 100° C. for 4 hours in a 1-liter flask with vigorous agitation. The mixture was then centrifuged to separate an oil layer from the water and resin. The water and resin were washed with several portions of petroleum ether and the washings added to the oil layer. This oil was subjected to steam distillation at 100° C. under high vacuum to remove the solvents. The solvent-free oil (the product) and the original gum were subjected to analysis with the following results:

| | Original gum | Product |
|---|---|---|
| Free fatty acids, percent | 5.0 | 26.3 |
| Phosphorus, p.p.m | 20,000 | 5,450 |
| Phosphatides, percent | 60.6 | 16.3 |

EXAMPLE II

| | Grams |
|---|---|
| Crude soybean oil | 100 |
| Water | 25 |
| Sulphonated polystyrene resin exchanger, H+ form | 3.5 |
| Deodorized kerosene | 100 |

The above materials were subjected to the same procedure as in Example I. The following results were obtained:

| | Crude oil | Oil after hydrolysis |
|---|---|---|
| Free fatty acids, percent | 0.72 | 1.60 |
| Phosphorus, p.p.m | 910 | 30 |
| Phosphatides, percent | 2.73 | 0.09 |

*Comparative test*

Example II was repeated except to the initial reactants there was added about 0.1 gram of a commercial emulsifying agent of the sodium alkylbenzene sulphonate type. In this case the oil after hydrolysis contained 62 percent free fatty acids indicating that there occurred a considerable degree of total hydrolysis to glycerol and free fatty acids.

EXAMPLE III

| | Grams |
|---|---|
| Crude soybean oil | 100 |
| Water | 25 |
| Sulphonated polystyrene resin exchanger, H+ form | 3.5 |

The above materials were heated at 150° C. under pressure in a sealed vessel for ½ hour with vigorous agitation. The mixture was cooled to 80° C. and centrifuged to separate the oil from the aqueous layer and resin. The aqueous layer and the resin were washed with petroleum ether and the washings were added to the oil. The petroleum ether was removed from the oil by steam distillation. The results are shown by the following analysis:

| | Crude oil | Oil after hydrolysis |
|---|---|---|
| Free fatty acids, percent | 0.72 | 2.0 |
| Phosphorus, p.p.m | 910 | 210 |
| Phosphatides, percent | 2.73 | 0.63 |

EXAMPLE IV

| | Grams |
|---|---|
| Crude soybean oil | 200 |
| Water | 50 |
| Sulphonated polystyrene exchange resin, H+ form | 10 |
| Quaternary ammonium polystyrene exchange resin, OH− form | 10 |

The above materials were heated at 120° C. under pressure with vigorous agitation in a sealed vessel and samples were removed after 10, 20 and 60 minutes. The samples were cooled and further treated as in Example III, to recover the oil fraction. The analyses of these oil fractions are shown in the following table:

| | Crude oil | Oil after hydrolysis at 120° C. | | |
|---|---|---|---|---|
| | | 10 min. | 20 min. | 60 min. |
| Free fatty acids, percent | 0.72 | 0.11 | 0.23 | 0.82 |
| Phosphorus, p.p.m | 910 | 473 | 159 | 142 |
| Phosphatides, percent | 2.73 | 1.42 | 0.48 | 0.43 |

Another experiment, similar to that of Example IV, was performed and the oil layer was refined with a 10-percent solution of sodium hydroxide in water in sufficient amount to remove substantially all of the free fatty acids and remaining phosphatides. A sample of the crude oil was similarly refined. The two refined oils were analyzed for mono- and di-glycerides by the adsorption method of Quinlan and Weiser, described at the 48th annual meeting of the American Oil Chemists' Society, held in New Orleans, Louisiana, May 1–3, 1957. The sample which had been hydrolyzed and refined contained a total of 2.2 percent more mono- and di-glycerides than the refined, crude oil.

Having thus described my invention, I claim:

1. A process for preparing partial glycerides which comprises subjecting a reaction mixture containing a phosphatide, water, an anion exchange material, and a cation exchange material to a temperature about from 100 to 150° C. until the phosphate ester groups of the phosphatide are hydrolyzed to a substantial degree, the reaction mixture being free from added emulsifying agent, and thereafter recovering a mixture of partial glycerides substantially free of phosphorus.

2. A process for preparing partial glycerides which comprises subjecting a reaction mixture containing a crude, phosphatide-containing glyceride oil, water, an anion exchange material, and a cation exchange material to a temperature about from 100 to 150° C. until the phosphate ester groups of the phosphatide are hydrolyzed to a substantial degree, the reaction mixture being free from added emulsifying agent, and thereafter recovering the glyceride oil containing an increased content of partial glycerides substantially free of phosphorus.

3. A process for preparing partial glycerides which comprises subjecting a crude, phosphatide-containing gum, water, an anion exchange material, and a cation exchange material to a temperature about from 100 to 150° C. until the phosphate ester groups of the phosphatide are hydrolyzed to a substantial degree, the reaction mixture being free from added emulsifying agent, and thereafter recovering a mixture of partial glycerides substantially free of phosphorus.

4. A process for removing the phosphatides from a crude glyceride oil and concomitantly increasing the partial glyceride content of the oil while suppressing hydrolysis of the glyceride content of the oil, which comprises subjecting a reaction mixture containing a crude, phosphatide-containing glyceride oil, water, an anion exchange material, and a cation exchange material at least partially in the hydrogen form, to a temperature about from 100 to 150° C. until the phosphatide is hydrolyzed to a substantial degree, the reaction mixture being free from added emulsifying agent, and thereafter recovering the glyceride oil containing partial glycerides substantially free of phosphorus.

5. A process for selectively hydrolyzing the phosphatides in a material containing phosphatides and fatty acid triglycerides which comprises subjecting a reaction mixture containing said material, water, an anion exchange material, and a cation exchange material to a temperature about from 100 to 150° C. until the phosphatides are hydrolyzed to a substantial degree, the reaction mixture being free from added emulsifying agent, and thereafter recovering from the reaction mixture a material containing the original fatty acid triglycerides and partial glycerides derived from hydrolysis of said phosphatides, said partial glycerides being substantially free of phosphorus.

References Cited in the file of this patent

UNITED STATES PATENTS

| 2,447,715 | Rose | Aug. 24, 1948 |
| 2,550,558 | Hansen | Apr. 24, 1951 |

OTHER REFERENCES

Chemical and Engineering News, p. 557, February 21, 1949.

Wittcoff: The Phosphatides, pp. 15 and 16 (1951), A.C.S., Monograph Series, No. 112, Reinhold Publishing Corp., 330 West 42nd Street, New York.